United States Patent [19]

Hofmann et al.

[11] 4,345,800
[45] Aug. 24, 1982

[54] DOUBLE-ROW RADIALLY SELF-ALIGNING ROLLER BEARING

[75] Inventors: Heinrich Hofmann; Günther Markfelder, both of Schweinfurt; Hans-Eberhard Bender, Biebertal, all of Fed. Rep. of Germany

[73] Assignee: Fag Kugelfischer Georg Schäfer & Co., Fed. Rep. of Germany

[21] Appl. No.: 119,551

[22] Filed: Feb. 7, 1980

[30] Foreign Application Priority Data

Feb. 17, 1979 [DE] Fed. Rep. of Germany ....... 2906210

[51] Int. Cl.³ ................... F16C 19/28; F16C 33/48
[52] U.S. Cl. ................................. 308/217; 308/213
[58] Field of Search ............... 308/212, 213, 214, 217, 308/218

[56] References Cited

U.S. PATENT DOCUMENTS

| | | | |
|---|---|---|---|
| 1,862,641 | 6/1932 | Turner | 308/212 |
| 2,227,064 | 12/1940 | Bryant | 308/217 |
| 2,705,176 | 3/1955 | Palmgreen | 308/217 |
| 3,495,888 | 2/1970 | Greiner et al. | 308/212 |
| 3,912,346 | 10/1975 | Boratynski et al. | 308/218 |
| 4,099,803 | 7/1978 | Knappe | 308/217 |
| 4,136,916 | 1/1979 | Musselman et al. | 308/213 |

FOREIGN PATENT DOCUMENTS

| | | | |
|---|---|---|---|
| 169244 | 10/1951 | Fed. Rep. of Germany | 308/217 |
| 107758 | 8/1974 | Fed. Rep. of Germany | |
| 661256 | 11/1951 | United Kingdom | |
| 673388 | 6/1952 | United Kingdom | 308/218 |
| 1,379,816 | 1/1975 | United Kingdom | 308/217 |

*Primary Examiner*—Richard R. Stearns
*Attorney, Agent, or Firm*—Ostrolenk, Faber, Gerb & Soffen

[57] ABSTRACT

The disclosure concerns a double-row, radially self-aligning, roller bearing. The bearing has an outer race ring and an inner race ring. Two annular arrays of rollers are carried in respective cages located at the two axial sides of the bearing. Each cage defines a respective pocket for each roller of the roller bearing. The circumferential side walls of a pocket are generally profiled to the sides of the respective roller. The cages are also defined by an axially inward and axially outward ring which joins the pocket walls. The diameters and placements of the rings of the cages are selected so that in an axial projection of the rings, one upon the other, the rings do not intersect. The axially more inward ring has an inner diameter that is not less than the outer diameter of the axially more outward cage ring, and the bearing rollers are inclined appropriately. The cages are comprised of elastic, flexible, plastic material enabling the cages thus shaped still to be installed in the race rings.

23 Claims, 8 Drawing Figures

DOUBLE-ROW RADIALLY SELF-ALIGNING ROLLER BEARING

BACKGROUND OF THE INVENTION

The present invention relates to a double-row, radially self-aligning roller bearing comprised of inner and outer race rings, two rows of barrel-shaped rollers and two single-piece cages.

Various types of self-aligning roller bearings are already known. These bearings, however, are always expensive to fabricate as it is always necessary to precisely guide the rollers. In one type of bearing, fixed or loose guide rims are necessary for this guidance, particularly on the inner race ring. Their manufacture is difficult and expensive. Furthermore, it is necessary to precisely comply with the roller, race rings and guide-rim profiles. In this way, the manufacture of the bearing is made even more expensive.

In another type of bearing without a rim, the guiding of the rollers takes place on the roller surface. Here strong sheet-metal or solid cages are necessary in order to prevent skewing of the rollers. When comb-like cages are used, annular, additional holding rims must also be provided so that the rollers do not drop out when the inner race ring is swung out. Another disadvantage is that due to the above-mentioned measures, for a given axial width of the bearing race rings, the rollers cannot exceed a given length. As a result, the load carrying capacity of the bearings is limited. As a result of using solid, comb-like cages and sheet-metal window cages, the race ring width is limited since the cages must be smaller than the diameter of the opening of the outer race ring.

SUMMARY OF THE INVENTION

The object of the present invention, therefore, is to improve double-row, radially self-aligning, roller bearings of the above-mentioned type to obtain exact guidance of the rollers, and in such a manner that the manufacture of the bearings is simple and economical, their assembly is effected readily and rapidly, the installation of longer rollers is possible for a predetermined bearing cross-section, and a greater width of the bearing is possible for predetermined bearing diameters.

According to the present invention, a double row, radially self-aligning roller bearing is provided. As with all bearings, there is a radially inner bearing race ring and a radially outer bearing race ring which are spaced apart. Bearing rollers between the race rings permit relative rotation of the race rings. There are two, annular, bearing roller cages, one at each axial side of the bearing. Each cage defines an annular array of roller pockets, each of which retains a bearing roller in it. The rollers in each pocket extend generally axially of the bearing. Each cage is comprised of two axially separated rings and is comprised of roller pocket walls at annularly spaced intervals which together with the cage rings define the pockets for the rollers. The annular cage rings of each cage are dimensioned so that when the roller is assembled, a projection of one cage ring onto the other cage ring would not intersect the latter cage ring. This is accomplished through the axially more inward ring of each cage having an inner diameter that is not less than the outer diameter of the axially more outward ring of each cage.

It is contemplated that each of the cages will be flexible and elastic. To accomplish this, the cages are preferably comprised of plastic material. When the cages are comprised of plastic material, they are molded units having a generally axially extending form parting line. The forms from which the cages are molded are oriented so that the form parting line on the molded cage extends generally to meet the outer diameter of the axially more outward ring of each cage and generally to meet the inner diameter of the axially more inward ring of each cage. These cage rings are also so placed that the angle between the form parting line and the respective central plane of each roller is greater than 90°. Preferably also, the cage ring surfaces which are formed by the form parting line and by a line parallel to the axis of the respective roller intersect at the axial and radial center point of the roller.

Utilization of a given bearing cross-section can be further increased if the orientation of the pockets in the cages and the positions of the cages and of the rollers and if the rollers are so developed that the axially inward ends of the two rows of rollers nearly or actually touch each other. To accomplish this, the cages and the race rings which support them are so shaped and oriented that the rollers in each array thereof are at a smaller diameter axially outwardly of the bearing and at a larger diameter axially inwardly of the bearing. In particular, the above recited angle between the form parting line and the intersecting line parallel to the axis of the roller enables the foregoing result.

The outer race ring has an inner diameter which defines an opening. The inner diameter of that opening is smaller than the largest outer diameter of the two cage rings. As a result, to insert and install the cage rings, they must be deformed and initially oriented in an unusual manner in order to install them in place. Making the cage rings out of plastic material and making them flexible and elastic is helpful in their installation.

The bearing further comprises two annular arrays of bearing rollers in their respective pockets. Each annular array has its rollers oriented so that the roller axes generally extend axially of the bearing. The rollers have roller surfaces. The peripheral surface of each roller curves gradually more convexly from the axial center of the roller toward the ends thereof. The pocket walls of the pockets, at least toward the axial ends of the roller surfaces, have guide surface sections which are adapted generally to the profiles of the respective roller surfaces and have narrow clearance with respect to the roller surfaces.

None of the race rings has rims, whereby simplified manufacture of the race rings is possible. Furthermore, it is possible to better utilize the entire bearing axial width because lengthened rollers can be used, which leads to an increased load-bearing capacity for the bearing. When the cages are comprised of plastic, they can be economically produced in a simple manner by two formed parts which can be extracted axially. The guide surfaces of the pocket walls assure good guidance of the rollers since the opposed pocket surfaces face the rollers with narrow clearance. The pockets are otherwise developed in a generally shaft shape, i.e., they are not adapted to the roller profile in the circumferential direction of the rollers. As a result, radial movement of the rollers is possible despite the narrow guidance in the pockets. This is of great importance, in particular in case of variations in temperature. Without the invention, there is a danger of jamming because the plastic of the cages has a substantially higher efficiency of thermal expansion than the steel of the rollers. With the invention, jamming of the rollers in their plastic cages does not occur. Furthermore, with the invention the pitch circle tolerances of the cages need also not be precisely maintained upon manufacture.

The barrel-shaped rollers are precisely guided by guide surfaces on the cage pocket walls, which face the barrel-shaped rollers with narrow clearance, at least in the region of the two ends of the roller surface. Due to the fact that the angle between the form-parting line of the two form parts and the roller central plane is greater than 90°, even if the dimensions of the cage change, the form parting edges cannot pass into the region of contact between the rollers and the cage guidance surfaces. For this reason, guide surfaces with narrow clearance are always opposite the rollers. Resting surfaces of approximately the same size for both sides of the rollers can be obtained if the ring surfaces which are formed by the form parting edge and the angle of inclination of the rollers intersect at the roller center point.

In order for the rollers to be retained in the cage, retaining surfaces, preferably projecting from the pocket walls, are provided. They project toward the rollers, but with larger clearance. The distances of the retaining surfaces from two opposed pocket walls are so great that, while snapping in of the rollers between the pocket walls is possible, falling out of the rollers is prevented.

Since no guide rims are present, the distance between the two roller end surfaces and the plane which passes through the largest roller diameter need not be maintained precisely. This leads to a substantial further reduction in the cost of the bearing. In this connection, it is important that the roller end surfaces need no longer be accurately machined. The bearings in accordance with the invention have no disadvantages as compared with known embodiments. In view of their uncomplicated construction, they are even superior with respect to their reliability in operation.

Holding of the rollers can also be effected in some other manner. The manufacture of the cages is simplified if pin-like projections are arranged on the inner sides of the two ring parts. These projections can be snapped into recesses in the roller ends.

Due to the greater curvature at the ends of the rollers as compared with the race rings, the danger of increased stresses at the edge, which occurs particularly in the case of high loads, is substantially reduced, which increases the reliability of operation.

When elastic roller cages of plastic material are used, it is possible for the inner diameter of the outer race ring of the bearing to be smaller than the outer diameter of the axially more inward ring parts of the cages, even if this cage ring part has the same cross-section over the entire circumference. In this connection, it is necessary to insert the first of the two cages into the outer race ring by first elastically deforming the cage in an oval shape. Thereupon the inner cage ring is introduced concentrically into the outer race ring. For mounting the second cage, it is necessary to arrange the inner race ring of the bearing axially and/or radially shifted or possibly obliquely to the outer race ring. For the introduction of the second cage, it is necessary that the inclined cage be introduced section-wise on the side of the larger gap between the outer race ring and the inner race ring and that the large ring part of the cage be temporarily elastically pressed into an oval shape. In this stage, the second cage can be introduced fully, since in this connection it can be shifted so far radially and axially that it can be tilted into the outer race ring also on the opposite side.

The introduction of the rollers is then effected in known manner by swinging the inner race ring and the cages with respect to the outer race ring. The rollers are inserted under spring action over the roller retaining surfaces in the cage pocket walls or over pin-shaped projections on the ring parts.

In this way, it is possible to construct substantially axially wider bearings of higher load-bearing capacity than was possible with previous cages. In particular, the bearings can now be made more than 5% wider than the difference between the outside diameter of the outer race ring and the bore diameter of the inner race ring. These are values which could not be achieved with previous bearings.

The optimal utilization of space with respect to the dimension of the bearing is obtained when the following approximation is used:

$$\left(\frac{B}{d/2 + \Delta d}\right)^2 \approx 3\left(\frac{D/2 - \Delta D}{d/2 + \Delta d}\right)^2 - 2\left(\frac{D/2 - \Delta D}{d/2 + \Delta d}\right) - 1$$

in which overall bearing axial width B, outer race ring outside diameter D, inner race ring bore diameter d, as well as the minimum wall thickness $\Delta D$ at the outer ring and $\Delta d$ at the inner ring, play a part. Under these conditions, it is assured that the introduction of the cages in the above-mentioned sense is still possible.

Other objects and features of the invention will be apparent from the following description and the accompanying drawings.

DESCRIPTION OF THE PREFERRED EMBODIMENTS

Figure 1:
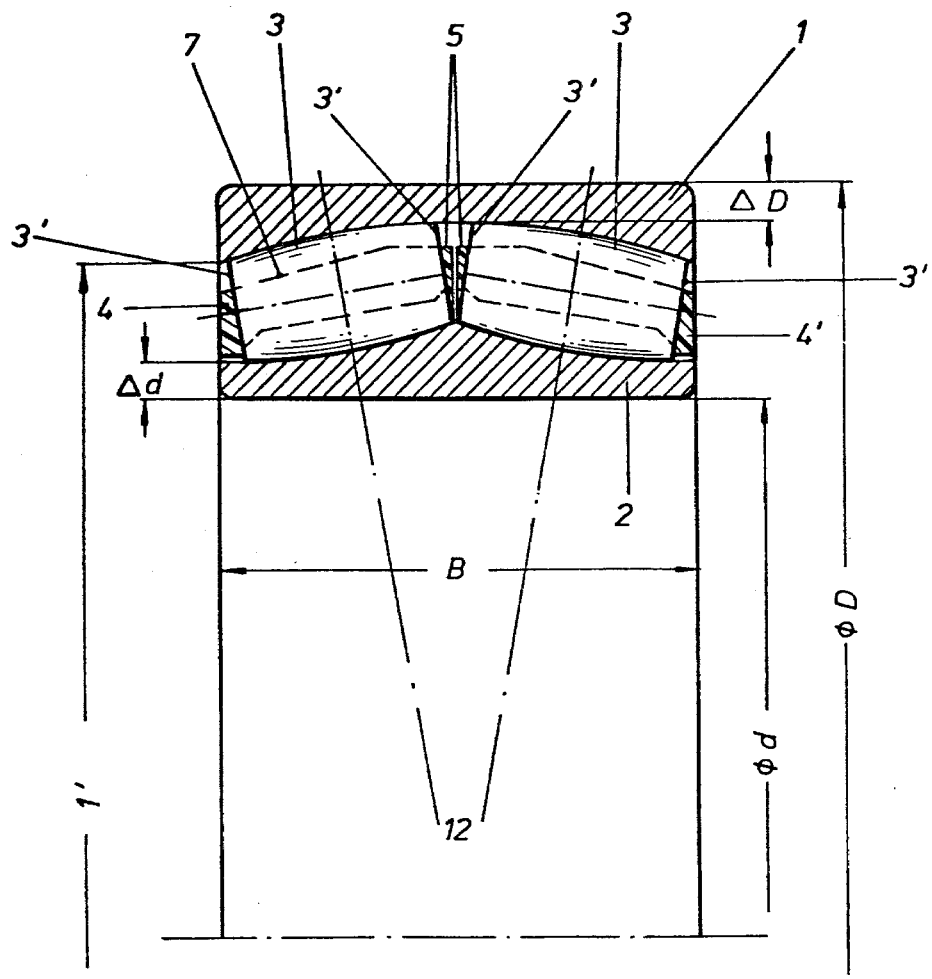
FIG. 1 is a fragmentary cross-sectional view through a radially self-aligning roller bearing in accordance with the invention.

The double-row, radially self-aligning roller bearing shown in FIG. 1 is comprised of the radially outer race ring 1, the rimless, radially inner race ring 2, the two annular rows of barrel-shaped bearing rollers 3, and the two identically developed, mirror image, window type cages 4 and 4'.

Figure 2:
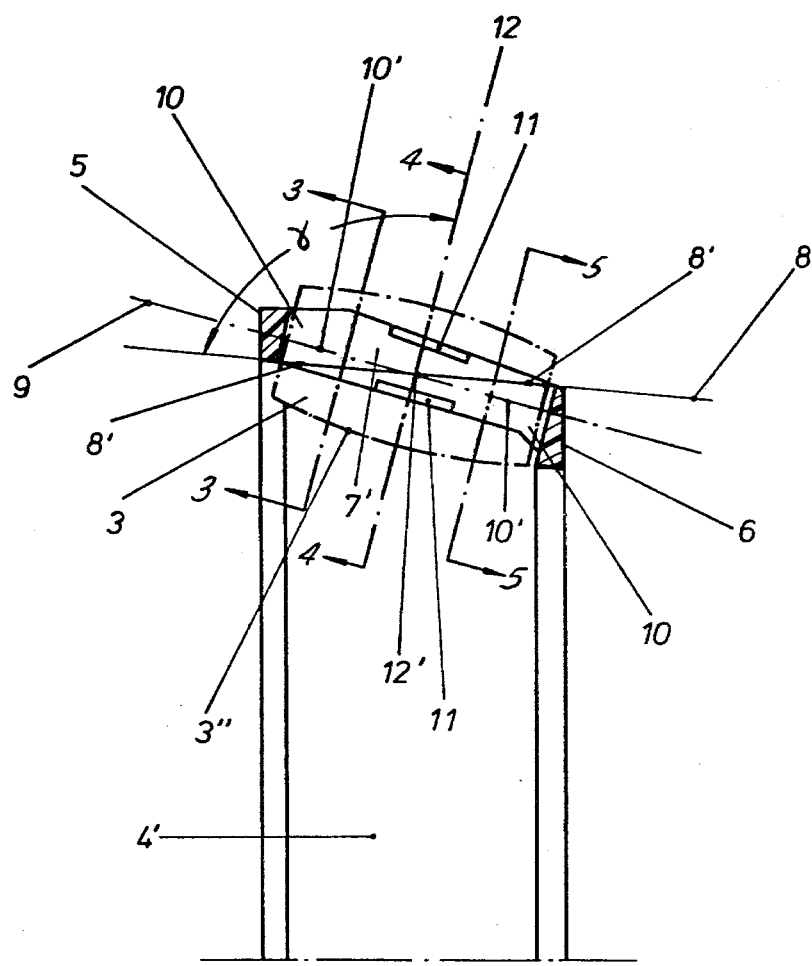
FIG. 2 is a fragmentary cross-sectional view through a cage showing the mounting of one roller therein.

The cages are called window cages because they include below described pockets which are open on their radially inward and outward sides. The cages are comprised of plastic and are elastic and deformable for enabling their installation as described below. One of the cages is shown in FIG. 2. It is comprised of two axially spaced ring parts 5 and 6 and the circumferentially spaced apart bars 7 which extend across the space between the ring parts and define pocket walls for the pockets in which the individual bearing rollers are positioned. The ring parts 5 and 6 have respective inner and outer diameters. The ring parts 5 and 6 are oriented and shaped so that they do not intersect as seen axially, i.e. in a projection of the axially more outward ring part 6 toward the radially more inward ring part 5, wherein the projection is axially across the bearing in FIG. 1, the rings do not intersect. This permits simple manufacture of the cage by two form parts (not shown), which are removable axially. This also produces a form parting line 8 on which form parting edges 8′ are formed for enabling disassembly of the form parts, on the one hand, and for the best possible adaptation of the pocket walls 7′ of the bars 7 to the roller profile on the other hand.

Figure 3:
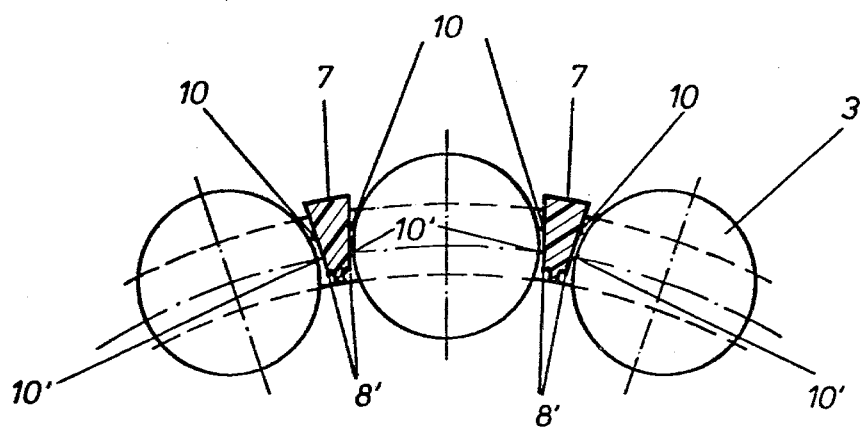
FIG. 3 shows a cross-section along the line 3—3 of FIG. 2.
Figure 5:
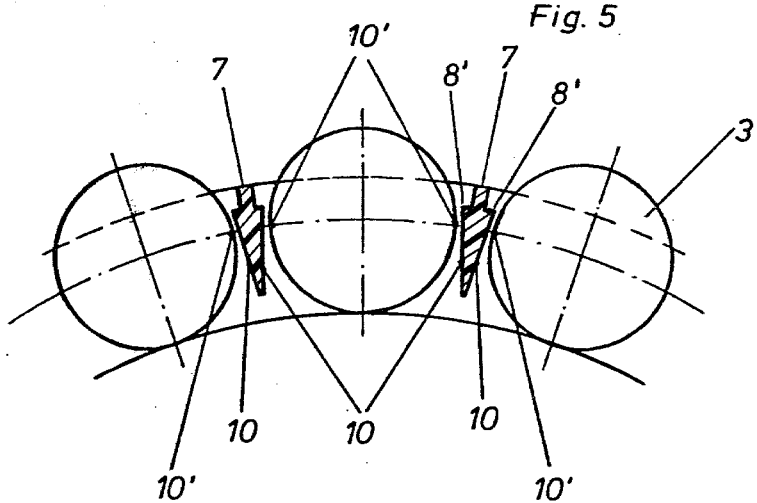
FIG. 5 shows a cross-section along the line 5—5 of FIG. 2.

The pocket walls 7′ are adapted to the roller profile only in the axial direction of the barrel-shaped rollers 3 and in the regions of the two ring parts 5 and 6, the walls 7′ are provided with guide sections 10 with narrow clearance from the rollers. In the circumferential direction of the rollers 3 the pocket walls 7′ are not fitted to the peripheral roller surface 3″, at least in the roller guide region. There is therefore produced on the guide surface section 10 of the pocket walls 7′ a line of contact 10′ between the roller 3 and the surface 10 of the pocket wall 7′. This can be noted in particular from FIGS. 3 and 5. These Figures show in two cross-sections 3—3 and 5—5 that the rollers 3 are arranged very closely opposite the guide surface section 10 of the pocket walls 7′. The same conditions are also present at other cross-sections (not shown) at different axial positions along the rollers, in which connection the roller diameters are merely larger or smaller and the bars are accordingly narrower or wider.

Figure 4:
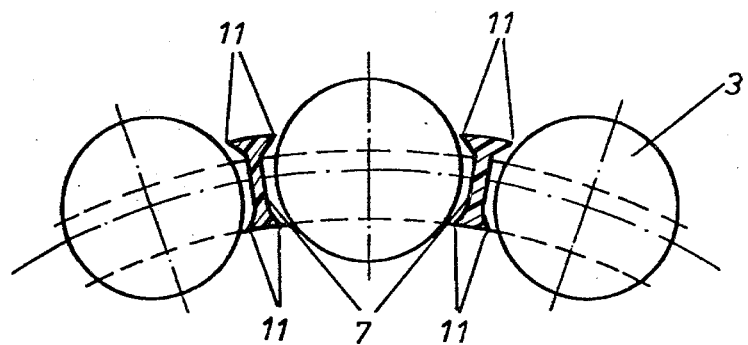
FIG. 4 shows a cross-section along the line 4—4 of FIG. 2.

In order to prevent the rollers 3 from falling out of the inner race ring, which is swung out, for instance, upon the mounting of the rings upon assembly of the bearing, retaining surfaces 11 are provided in the shell and bore regions of the pocket walls 7′. The profiles of these surfaces can be noted from the cross-section 4—4 of FIG. 4. While the large clearances at retaining surfaces 11 shown here makes possible the snapping of the rollers 3 into the cage 4′, it at the same time prevents their falling out. The absence of the retaining and guiding rims of FIG. 1 makes it unnecessary to maintain precisely the distance between the two roller end surfaces 3′ and the plane 12 across the roller at the largest roller diameter.

From FIG. 2 it can be noted that the angle between the form parting line 8 and the roller central plane 12 is more than 90°. In this way, on both sides of the lines of inclination 9 of the rollers 3, relatively wide guide-surface sections 10 are produced, by means of which exact guiding of the rollers 3 is always assured even upon radial displacement of the rollers 3 in the pockets 7′, due, for instance, to a different extent of heating of the bearing parts. As can be noted from FIGS. 3 and 5, in particular, passage of the contact line 10′ between the rollers 3 and the guide surface sections 10 of the pockets 7′ beyond the form parting edge 8′, which is necessary for reasons of manufacture, and where the roller guidance qualities are substantially poorer, is not possible. In the embodiment shown, the ring surfaces which are formed by the form-parting line 8 and the inclination line 9 of the rollers 3 intersect in the roller center point 12′. In this way, the possible guide-surface sections 10 on both sides of the roller central plane 12 are approximately the same size.

As can be noted from FIG. 1, the inner ring parts 5 in the cages 4, 4′ have a larger outer diameter than the diameter of the opening 1′ of the outer race ring 1. This permits wider embodiments of the bearings, with greater load carrying capacity, to be manufactured. This is made possible by the elasticity of the plastic window cages 4, 4′.

Figure 6:
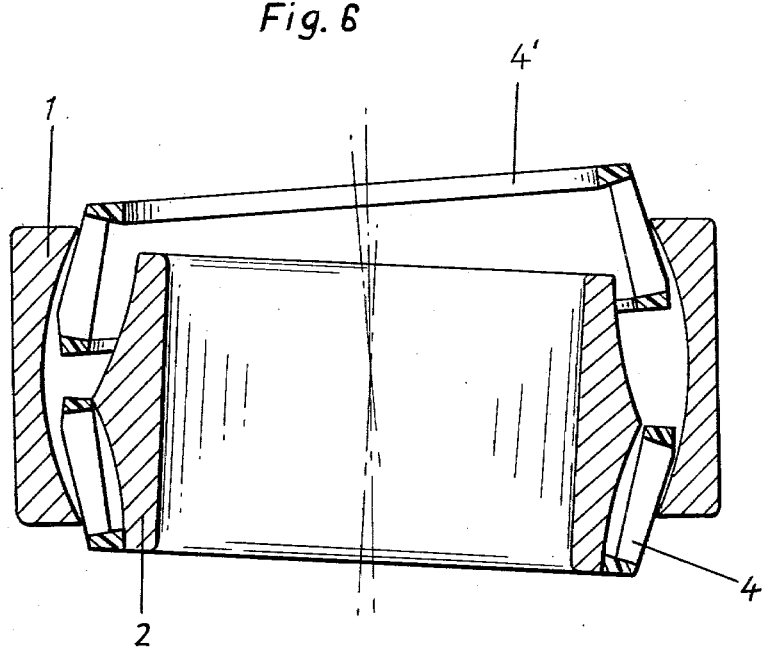
FIG. 6 shows a cross-section through the bearing during the introduction of the cage into the bearing.
Figure 8:
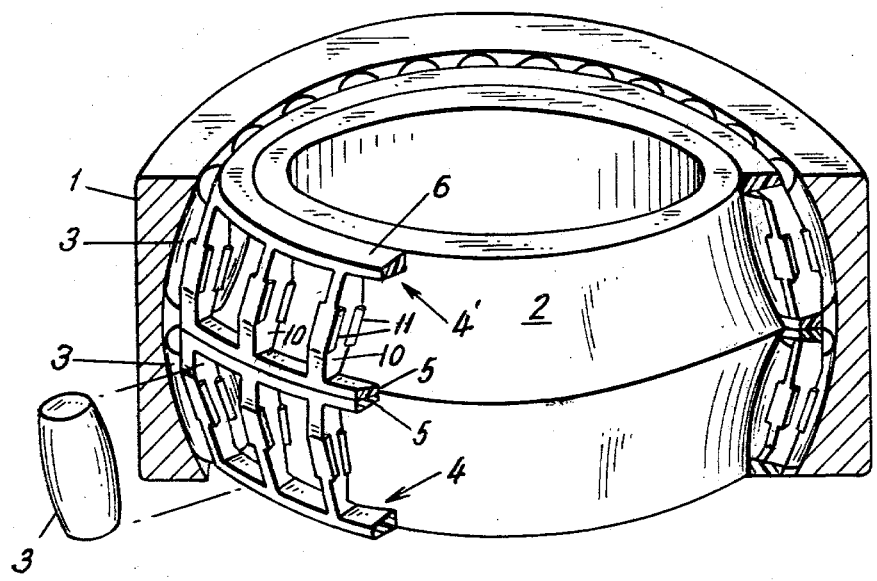
FIG. 8 is a perspective view, partly broken away, showing an entire bearing according to the invention.

Mounting can be effected in the following manner. First, one cage 4 is introduced into the outer race ring 1 by deforming the cage into an oval and then swinging the cage inward. Thereupon, the inner race ring 2 can be introduced without difficulty. To mount the second cage 4′, as can be noted from FIG. 6, both axial and radial displacement and inclination of the inner race ring 2 is performed within the outer ring 1. This creates sufficient space for the second cage 4′, which can then be introduced into the outer race ring 1 by deforming the cage 4′ into an oval and by appropriate radial and axial displacement of the parts, as well as by swinging them into place.

By these measures, it is possible to make the width of the bearing B more than 5% greater than the difference between outside diameter D of the outer race ring 1 and bore diameter d of the inner race ring 2. These are conditions which could not be exceeded with known types of bearings since the installation of simple and cheap cages had not been possible.

Optimal utilization of space with respect to the dimension of the bearing is obtained when the dimensional approximation recited in the Summary of the Invention is used.

Figure 7:
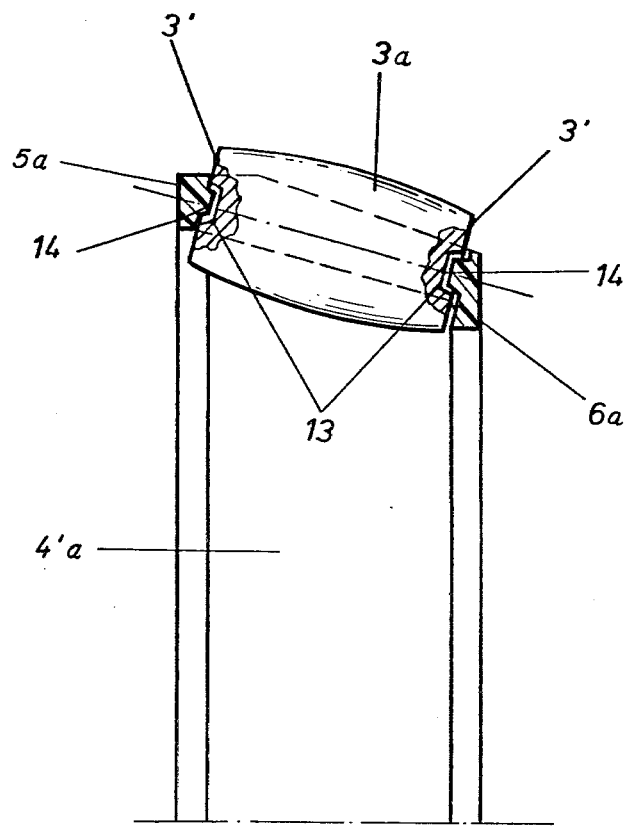
FIG. 7 shows a partial cross-section through a modified cage embodiment.

Another possible design for the cages 4′a with respect to the retaining means for the rollers 3a is shown in FIG. 7. In this case, the rollers 3a are provided in the centers of their two ends 3a with recesses 13 into which projections 14 of the cage ring parts 5a and 6a snap. This prevents the rollers 3 from falling out of the cages.

Although the present invention has been described in connection with a number of preferred embodiments thereof, many variations and modifications will now become apparent to those skilled in the art. It is preferred, therefore, that the present invention be limited not by the specific disclosure herein, but only by the appended claims.

What is claimed is:

1. A double-row, radially self-aligning, roller bearing, comprising:

a radially inner race ring; a radially outer race ring which is radially outward of the radially inner race ring, wherein the race rings define races of the roller bearing;

two annular roller cages, one for each axial side of the roller bearing, and each roller cage being for retaining a respective annular array of rollers at an orientation wherein the rollers generally extend axially of the roller bearing and for guiding the rollers in their rotation;

each cage comprising an annular series of roller pockets, each pocket for retaining a roller therein; the pockets being defined, at the circumferential sides thereof, between a respective pair of circumferentially spaced apart pocket walls of the cage; each cage also being comprised of a pair of annular rings located at axially opposite sides of the pockets, and the pocket walls being attached at the ends thereof to the cage rings; the cage rings of each cage having respective inner and outer diameters selected such that in an axial view of the roller bearing, the projection of one cage ring onto the other cage ring does not intersect the other cage ring;

each cage being a molded unit having a generally axially extending form parting line, which parting line is arranged to generally meet the outer diameter of the axially more outward cage ring of each cage and to generally meet the inner diameter of the axially more inward cage ring of each cage; each roller having a respective central plane, and the angle between the form parting line and the roller central plane being greater than 90°;

two annular arrays of bearing rollers, with each annular array having rollers oriented therein with respective axes that generally extend axially of the bearing; each roller having a roller surface; the pocket walls of the pockets having, at least toward the axial ends of the roller surfaces, guide surface sections which are adapted, along the axial direction of the rollers but not in the circumferential direction of the rollers, to the profile of the respective roller surface, and the guide surface sections having narrow clearance with respect to the roller surfaces.

2. The roller bearing of claim 1, wherein the pocket walls, in the region thereof between the cage rings, include retaining surfaces with project toward, but are spaced from, the surfaces of the rollers, and which are shaped for retaining the rollers against separating out of the pockets.

3. The roller bearing of claim 1, wherein the outer race ring has an inner diameter for defining an opening in the outer race ring; the largest outer diameter of the two cage rings being greater than the smallest inner diameter of the outer race ring opening.

4. The roller bearing of claim 1, wherein the rings of the cage have respective projections extending toward the ends of the rollers, and the rollers have recesses adapted for receiving the cage ring projections, for aiding in retention of the rollers in the cages.

5. The roller bearing of claim 1, wherein the cages and race rings are so shaped and oriented that the rollers in each array thereof are at a smaller diameter axially outwardly of the bearing and at a larger diameter axially inwardly of the bearing.

6. The roller bearing of claim 1, wherein each roller is oriented such that the ring surfaces which are formed by the form parting line and by a line parallel to the axis of the respective roller intersect at the axial and radial center point of the roller.

7. The roller bearing of claim 1, wherein the axially more inward ring of each cage has an inner diameter that is not less than the outer diameter of the axially more outward ring of each cage.

8. The roller bearing of either of claims 1, or 7, wherein the pockets of the two annular arrays of pockets which are in the two cages are so oriented and shaped and positioned with respect to each other that the rollers in the two annular arrays of rollers nearly contact each other.

9. The roller bearing of claim 8, wherein the outer race ring has an inner diameter for defining an opening in the outer race ring; the largest outer diameter of the two cage rings being greater than the smallest inner diameter of the outer race ring opening.

10. The roller bearing of claim 8, wherein the inner race ring is shiftable in its orientation with respect to the outer race ring for enabling mounting of the cages to the race rings.

11. The roller bearing of either of claims 1, or 7, wherein the surface of each roller is increasingly convexly curved from the axial center of the roller toward the ends thereof.

12. The roller bearing of either of claims 1, or 7, wherein the outer race ring has an inner diameter for defining an opening in the outer race ring; the largest outer diameter of the two cage rings being greater than the smallest inner diameter of the outer race ring opening.

13. The roller bearing of claim 12, wherein the inner race ring is shiftable in its orientation with respect to the outer race ring for enabling mounting of the cages to the race rings.

14. The roller bearing of either of claims 1, or 7, wherein the axial width of the bearing is more than 5% greater than the difference between the outer diameter D of the outer race ring and the inner diameter d of the inner race ring.

15. The roller bearing of either of claims 1, or 7, wherein the bearing has dimensions in accordance with the following approximation:

$$\left( \frac{B}{d/2 + \Delta d} \right)^2 \approx 3 \left( \frac{D/2 - \Delta D}{d/2 + \Delta d} \right)^2 - 2 \left( \frac{D/2 - \Delta D}{d/2 + \Delta d} \right) - 1$$

wherein B is the axial width of the bearing, D is the outside diameter of the outer race ring of the bearing, d is inner diameter of the inner race ring of the bearing, $\Delta D$ is the minimum wall thickness at the outer race ring and $\Delta d$ is the minimum wall thickness at the inner race ring.

16. The roller bearing of claim 1, wherein for each cage, the respective ring parts thereof have the same contour, viewed in any radial section thereof.

17. The roller bearing of claim 1, wherein the cages are comprised of flexible and elastic material for enabling the cages to be deformed and to restore themselves to an undeformed condition.

18. The roller bearing of claim 17, wherein the cages are comprised of plastic material.

19. The roller bearing of any of claims 1, 2, 3, 4, 5, 6 or 17, wherein the race rings are developed without additional guide elements for the rollers.

20. A double-row, radially self-aligning, roller bearing, comprising:

a radially inner race ring; a radially outer race ring which is radially outward of the radially inner race ring, wherein the race rings define races of the roller bearing and the race rings are developed without additional guide elements for the rollers;

two annular roller cages, one for each axial side of the roller bearing, and each roller cage being for retaining a respective annular array of rollers at an orientation wherein the rollers generally extend axially of the roller bearing and for guiding the rollers in their rotation;

each cage comprising an annular series of roller pockets, each pocket for retaining a roller therein; the pockets being defined, at the circumferential sides thereof, between a respective pair of circumferentially spaced apart pocket walls of the cage; each cage also being comprised of a pair of annular rings located at axially opposite sides of the pockets, and the pocket walls being attached at the ends thereof to the cage rings; the cage rings of each cage having respective inner and outer diameters selected such that in an axial view of the roller bearing, the projection of one cage ring onto the other cage ring does not intersect the other cage ring;

to annular arrays of bearing rollers, with each annular array having rollers oriented therein with respective axes that generally extend axially of the bearing; each roller having a roller surface; the pocket walls of the pockets having, at least toward the axial ends of the roller surfaces, guide surface sections which are adapted, along the axial direction of the rollers but not in the circumferential direction of the rollers, to the profile of the respective roller surface, and the guide surface sections having narrow clearance with respect to the roller surfaces;

the bearing has dimensions in accordance with the following approximation:

$$\left(\frac{B}{d/2 + \Delta d}\right)^2 \approx 3\left(\frac{D/2 - \Delta D}{d/2 + \Delta d}\right)^2 - 2\left(\frac{D/2 - \Delta D}{d/2 + \Delta d}\right) - 1$$

wherein B is the axial width of the bearing, D is the outside diameter of the outer race ring of the bearing, d is inner diameter of the inner race ring of the bearing, $\Delta D$ is the minimum wall thickness at the outer race ring and $\Delta d$ is the minimum wall thickness at the inner race ring.

21. The roller bearing of claim 20, wherein each cage is a molded unit having a generally axially extending form parting line, which parting line is arranged to generally meet the outer diameter of the axially more outward cage ring of each cage and to generally meet the inner diameter of the axially more inward cage ring of each cage; each roller having a respective central plane, and the angle between the form parting line and the roller central plane is greater than 90°.

22. A double-row, radially self-aligning, roller bearing comprising:

a radially inner race ring; a radially outer race ring which is radially outward of the radially inner race ring, wherein the race rings define races of the roller bearing;

two annular roller cages, one for each axial side of the roller bearing, and each roller cage being for retaining a respective annular array of rollers at an orientation wherein the rollers generally extend axially of the roller bearing and for guiding the rollers in their rotation;

each cage comprising an annular series of roller pockets, each pocket for retaining a roller therein; the pockets being defined, at the circumferential sides thereof, between a respective pair of circumferentially spaced apart pocket walls of the cage; each cage also being comprised of a pair of annular rings located at axially opposite sides of the pockets, and the pocket walls being attached at the ends thereof to the cage rings; the cage rings of each cage having respective inner and outer diameters selected such that in an axial view of the roller bearing, the projection of one cage ring onto the other cage ring does not intersect the other cage ring;

each cage being a molded unit having a generally axially extending form parting line, which parting line is arranged to generally meet the outer diameter of the axially more outward cage ring of each cage and to generally meet the inner diameter of the axially more inward cage ring of each cage; each roller having a respective central plane, and the angle between the form parting line and the roller central plane being greater than 90°;

two annular arrays of bearing rollers, with each annular array having rollers oriented therein with respective axes that generally extend axially of the bearing; each roller having a roller surface; the pocket walls of the pockets having, at least toward the axial ends of the roller surfaces, guide surface sections which are adapted, along the axial direction of the rollers but not in the circumferential direction of the rollers, to the profile of the respective roller surface, and the guide surface sections having narrow clearance with respect to the roller surfaces;

the bearing has dimensions in accordance with the following approximation:

$$\left(\frac{B}{d/2 + \Delta d}\right)^2 \approx 3\left(\frac{D/2 - \Delta D}{D/2 + \Delta d}\right)^2 - 2\left(\frac{D/2 - \Delta D}{D/2 + \Delta d}\right) - 1$$

wherein B is the axial width of the bearing, D is the outside diameter of the outer race ring of the bearing, d is inner diameter of the inner race ring of the bearing, $\Delta D$ is the minimum wall thickness at the outer race ring and $\Delta d$ is the minimum wall thickness at the inner race ring.

23. A double-row, radially self-aligning, roller bearing, comprising:

a radially inner race ring; a radially outer race ring which is radially outward of the radially inner race ring, wherein the race rings define races of the roller bearing;

two annular roller cages, one for each axial side of the roller bearing, and each roller cage being for retaining a respective annular array of rollers at an orientation wherein the rollers generally extend axially of the roller bearing and for guiding the rollers in their rotation;

each cage comprising an annular series of roller pockets, each pocket for retaining a roller therein; the pockets being defined, at the circumferential sides thereof, between a respective pair of circumferentially spaced apart pocket walls of the cage; each cage also being comprised of a pair of annular rings located at axially opposite sides of the pockets, and the pocket walls being attached at the ends thereof to the cage rings; the cage rings of each cage having respective inner and outer diameters selected such that in an axial view of the roller bearing, the projection of one cage ring onto the other cage ring does not intersect the other cage ring;

two annular arrays of beaing rollers, with each annular array having rollers oriented therein with respect axes that generally extend axially of the bearing; each roller having a roller surface; the pocket walls of the pockets having, at least toward the axial ends of the roller surfaces, guide surface sections which are adapted, along the axial direction of the rollers but not in the circumferential direction of the rollers, to the profile of the respective roller surface, and the guide surface sections having narrow clearance with respect to the roller surfaces;

the bearing has dimensions in accordance with the following approximation:

$$\left(\frac{B}{d/2 + \Delta d}\right)^2 \approx 3\left(\frac{D/2 - \Delta D}{d/2 + \Delta d}\right)^2 - 2\left(\frac{D/2 - \Delta D}{d/2 + \Delta d}\right) - 1$$

wherein B is the axial width of the bearing, D is the outside diameter of the outer race ring of the bearing, d is inner diameter of the inner race ring of the bearing, $\Delta D$ is the minimum wall thickness at the outer race ring and $\Delta d$ is the minimum wall thickness at the inner race ring.

* * * * *